United States Patent
Au et al.

(10) Patent No.: US 7,171,397 B1
(45) Date of Patent: Jan. 30, 2007

(54) METHOD AND SYSTEM FOR MEASURING PARALLELISM OF A DATABASE SYSTEM EXECUTION STEP

(75) Inventors: Grace Kwan-On Au, Rancho Palos Verdes, CA (US); May Wat Pederson, San Diego, CA (US); Sang-Luen Helen Fan, Los Angeles, CA (US)

(73) Assignee: NCR Corp., Dayton, OH (US)

( * ) Notice: Subject to any disclaimer, the term of this patent is extended or adjusted under 35 U.S.C. 154(b) by 511 days.

(21) Appl. No.: 10/224,833

(22) Filed: Aug. 21, 2002

(51) Int. Cl.
*G06F 17/30* (2006.01)

(52) U.S. Cl. ............... 707/2; 707/3; 707/4; 707/5; 707/100; 707/101

(58) Field of Classification Search ............ 707/2–5, 707/100, 101
See application file for complete search history.

(56) References Cited

U.S. PATENT DOCUMENTS

| | | | |
|---|---|---|---|
| 5,857,180 A * | 1/1999 | Hallmark et al. ............... 707/2 |
| 6,081,801 A * | 6/2000 | Cochrane et al. ............... 707/3 |
| 6,192,359 B1 * | 2/2001 | Tsuchida et al. ............... 707/4 |
| 6,820,262 B1 * | 11/2004 | Tellez et al. ............... 718/106 |

OTHER PUBLICATIONS

Paulsell, Karen, "Sysbase Adaptive Server Enterprise Performance and Tuning Guide: Query Tuning", Server Publishcation Group, Oct. 1999.*
Mahapatra et al., "Oracle Parallel Processing", O'Reilly Publisher, Aug. 2000, pp. 285.*

* cited by examiner

*Primary Examiner*—Khanh B. Pham
(74) *Attorney, Agent, or Firm*—Baker Botts; Harden E. Stevens, III; John D. Cowart

(57) ABSTRACT

A method and computer program are disclosed for measuring the parallelism of an execution step. The method includes determining whether the step operates on rows whose primary index is specified. If the primary index is specified, the parallelism is measured as single. If the primary index is not specified, the method determines whether the step uses an output from a previous step. If an output is used, the number of rows in the output is compared to a specified number. If the number of rows is greater than the specified number, the parallelism is measured as total. In one implementation, the geography of the output is determined and the previous step is compared to specified types such that if the primary index is not specified, the number is rows is not greater than a specified number, the geography does not write output rows to all parallel units, and the previous step is of a specified type, then the parallelism is measured as partial.

30 Claims, 5 Drawing Sheets

METHOD AND SYSTEM FOR MEASURING PARALLELISM OF A DATABASE SYSTEM EXECUTION STEP

BACKGROUND

Conventional database systems store data in the form of records or rows. Each row includes one or more related items of information. For example, a row can include the date, number, amount and customer for an order. Certain groups of rows are organized into tables. For example, an Orders table can include all of the rows describing the characteristics of orders that have been received.

Users of database systems manipulate and extract information from the tables and rows that make up the system. Such requests are conventionally referred to as queries. Queries can range in complexity from a request for the display of the information in a particular row to an accumulation of data regarding rows and tables that comprise terabytes of information. Users of database systems also insert, delete, and update the information stored in the tables and rows.

Database systems that employ parallel processing can manipulate and extract information from multiple rows and tables at the same time. Such systems can also execute multiple queries at the same time, if those queries do not create conflicts in the use of system resources. Measuring the parallelism of the execution steps of a query can determine the appropriate limit on the system resources used by those steps. One example of measuring parallelism is determining whether a step uses one of the parallel units, some of the parallel units, or all of the parallel units. Those measurements can be referred to respectively as single, partial, and total parallelism.

SUMMARY

In general, in one aspect, the invention features a method for measuring the parallelism of an execution step. The method includes determining whether the step operates on rows whose primary index is specified. If the primary index is specified, the parallelism is measured as single. If the primary index is not specified, the method determines whether the step uses an output from a first previous step. If an output is used, the number of rows in the output is compared to a specified number. If the number of rows is greater than the specified number, the parallelism is measured as total.

Implementations of the invention may include one or more of the following. The specified number of rows can be defined as a percentage of the total number of parallel units in the database system. If an output is used, the geography of the output can be determined. If the geography of the output writes the output rows to all parallel units, the parallelism is measured as total. If an output is used, the first previous step that generated the output is compared to specified types. If the first previous step is not one of the specified types, the parallelism is measured as total. The specified types can include rows retrieval steps that retrieve rows with specific primary index values from a database table. The specified types can include rows retrieval steps that retrieve rows from an output of a second previous step that has single or partial parallelism. The specified types can include join steps that join an output of a second previous step that has partial parallelism to the primary index of a database table. The specified types can include join steps that directly join between a first database table having a known primary index and a second database table. The specified types can include join steps that join an output of a second previous step and an output of a third previous step, where each of the second and third previous steps has single or partial parallelism.

In general, in another aspect, the invention features a computer program for measuring parallelism of a step including executable instructions that cause a computer to determine whether the step operates on rows whose primary index is specified. If the primary index is specified, the parallelism is measured as single. If the primary index is not specified, the program determines whether the step uses an output from a first previous step. If an output is used, the number of rows in the output is compared to a specified number. If the number of rows is greater than the specified number, the parallelism is measured as total.

In general, in another aspect, the invention features a database system for measuring parallelism of a step. The system includes one or more nodes, a plurality of CPUs, each of the one or more nodes providing access to one or more CPUs, and a plurality of processes, each of the one or more CPUs providing access to one or more virtual processes. Each process is configured to manage data, including database table rows, stored in one of a plurality of data-storage facilities. An execution step analysis component is configured to determine whether the step operates on rows whose primary index is specified. If the primary index is specified, the parallelism is measured as single. If the primary index is not specified, the program determines whether the step uses an output from a first previous step. If an output is used, the number of rows in the output is compared to a specified number. If the number of rows is greater than the specified number, the parallelism is measured as total.

DETAILED DESCRIPTION

Figure 1:
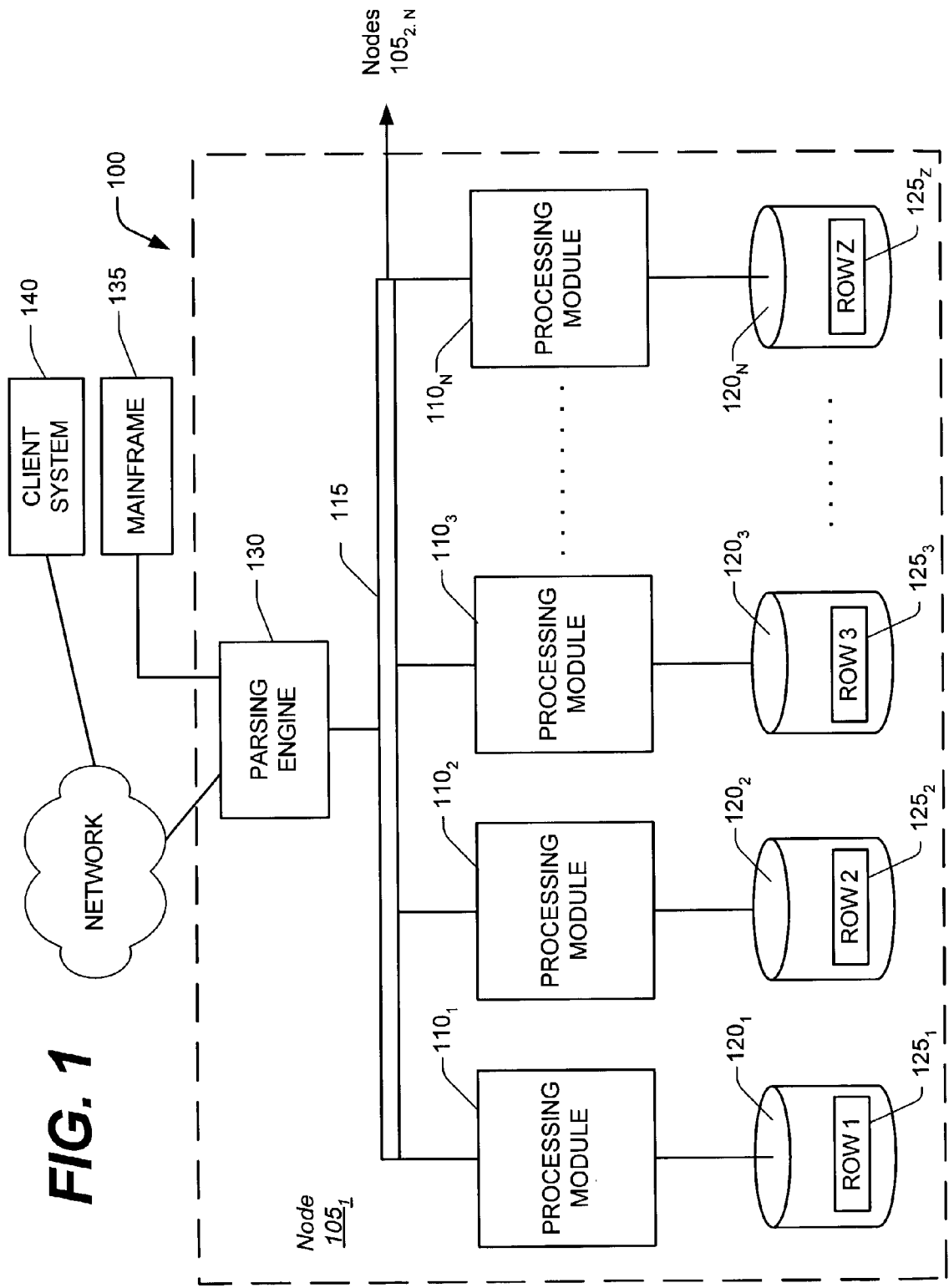
FIG. 1 is a block diagram of a node of a parallel processing database system.

The parallelism measurement technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
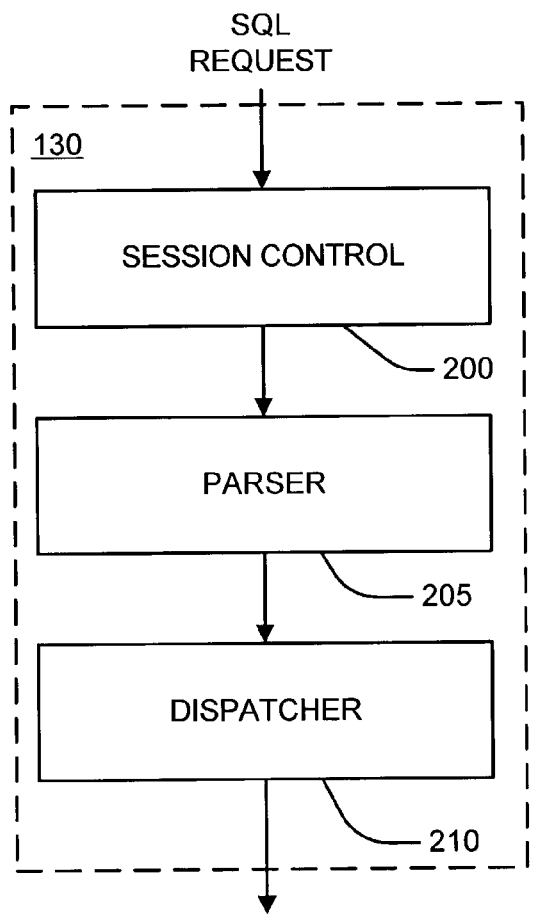
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
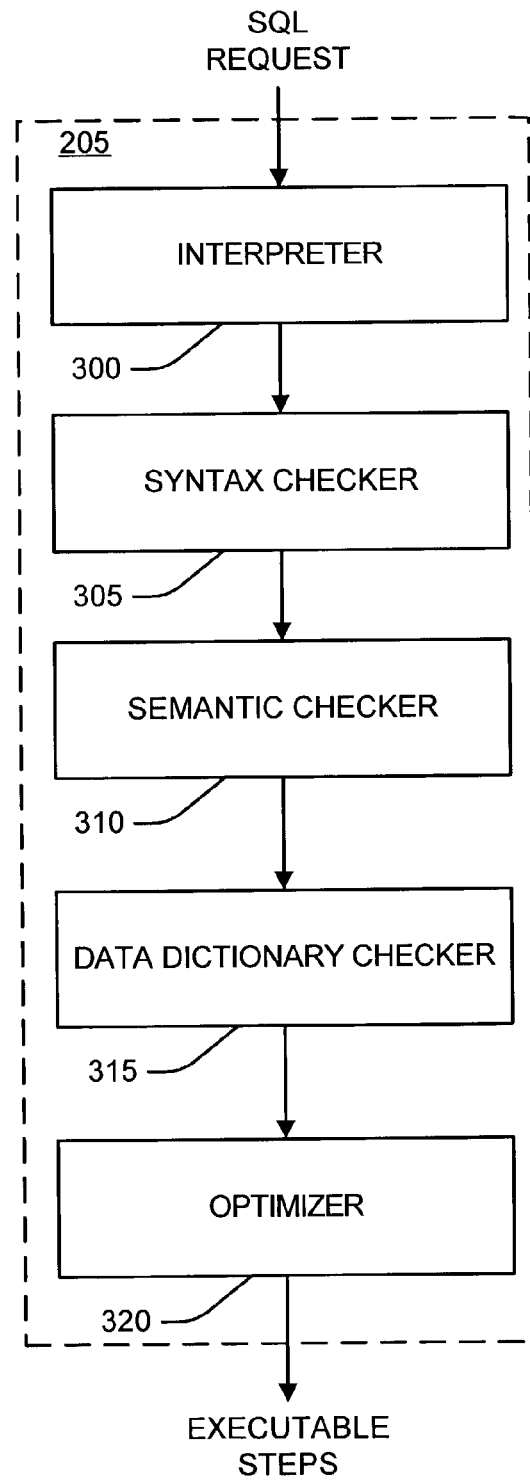
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

The optimizer 320 can develop plans based on the extent to which the execution steps of SQL request are determined to require the use of one, some, or all of the data-storage facilities $120_{1 \ldots N}$ and associated processing modules $110_{1 \ldots N}$ For example, a step that is determined to require the use of all the data-storage facilities $120_{1 \ldots N}$ and associated processing modules $110_{1 \ldots N}$ will employ resources at each of those facilities and modules even if no output results from certain modules. The database system 100 may also place a table-lock on the database table on which the step is operating. If a step is determined to require the use of only some facilities and associated modules, the other resources are not employed and it is possible to lock only those rows on which the step is operating. The number of facilities and processing modules that a step will employ is referred to herein as the parallelism of the step. A step with single parallelism employs one facility and associated module. A step with partial parallelism employs multiple facilities and associated modules, but not all of them. A step with total parallelism employs all the facilities and modules. Measuring the parallelism of a step allows the optimizer 320 to develop plans that aid in the concurrent operation of tactical queries.

Figure 4:
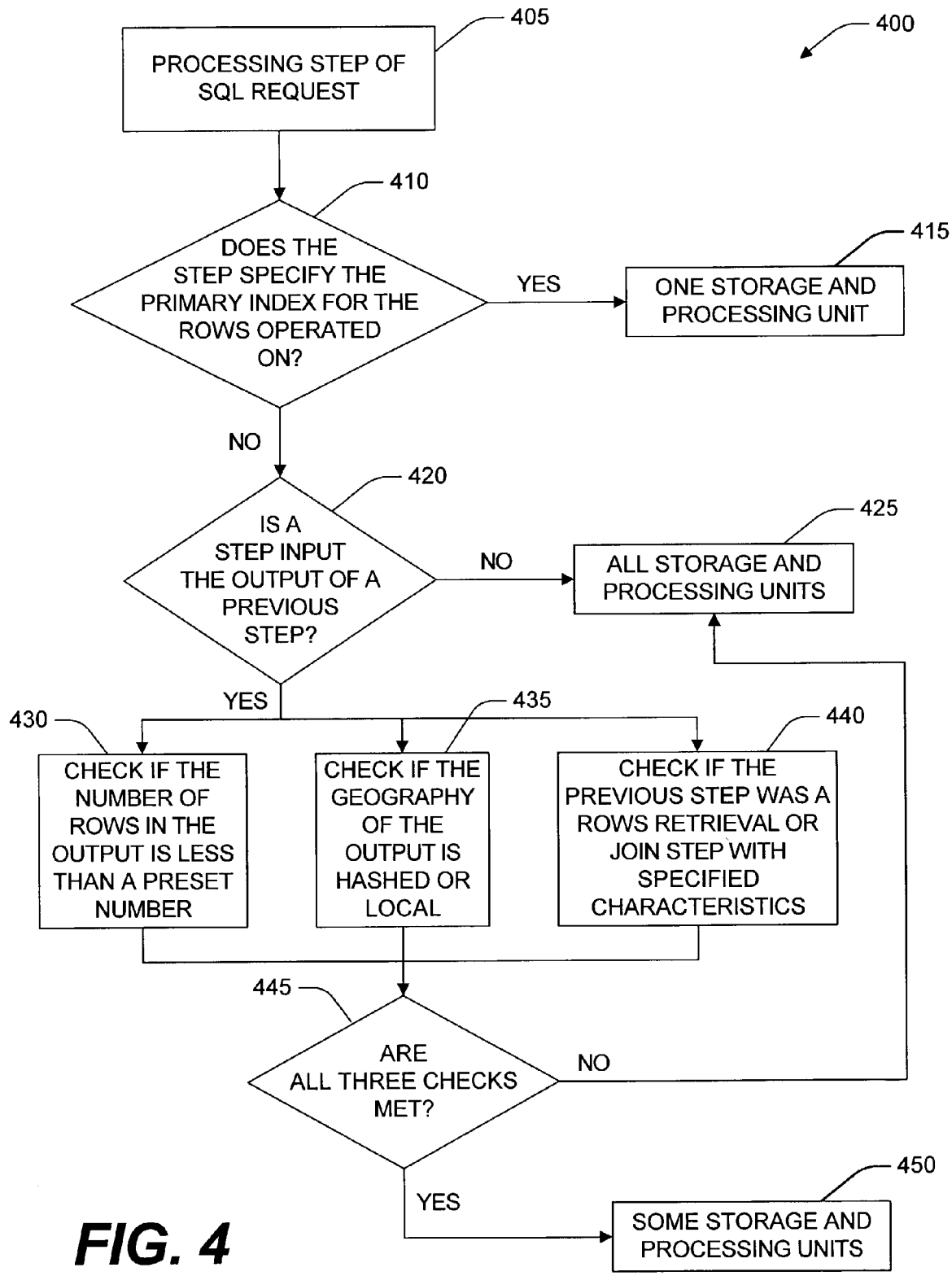
FIG. 4 is a flow chart for a method of measuring the parallelism of a step of a SQL request.

FIG. 4 is a flow chart depicting an implementation of a method for measuring the parallelism of an execution step 400. The processing step of the SQL request 405 is checked to see if it specifies the primary index for the rows operated on 410. If it does, the step can be performed on one storage and processing unit 415. The parallelism of the step is measured as single. If the step does not specify the primary index, the inputs of the step are checked to see if one is the output of a previous step 420. If none of the inputs are an output of a previous step, the step is classified as requiring all the storage and processing units 425. The parallelism of the step is measured as total. If a previous step output is an input of the processing step 405, the number of rows in the output are compared to a preset or specified number 430. The comparison can be performed with an estimation of the number of rows in the output. The specified number can be calculated as a percentage of the number of storage and processing units in the system. In one implementation, the comparison is used to determine that in the worst case that every row in the output goes to a different storage and processing unit only a subset of the total number of units will receive a row.

The output is also checked to determine if its geography is hashed or local 435. The geography of an output is a description of where rows in the output are written in the system. For example, in a hashed geography the rows are written to storage and processing units based on the hash bucket that results from a designated column of the row. In a local geography each row is written to the storage and processing unit where it was generated. Hashed and local geographies do not require the use of all the units. Other geographies can require the use of all the units, even for a single row. For example, in a duplicate geography each row is written to every storage and processing unit.

The previous step that generated the output is checked to see if it was a rows retrieval or join step with specified characteristics 440. The specified characteristics are discussed in more detail with regard to FIGS. 5 and 6. If all of the three checks are met 445, the step can be performed on some storage and processing units 450. The measured parallelism of the step is partial parallelism. If any of the three checks are not met 445, the step is performed on all of the storage and processing units 425. The measured parallelism of the step is then total parallelism.

An example of a query that could produce steps that would need parallelism measurement is shown below. In this example, the customer table has a primary index of the custid column and the orders table has a primary index of the orderdate column.

EXAMPLE 1

SELECT customer.name, customer.address, customer.phone
  FROM customer, orders
  WHERE customer.custid=orders.custid and orders.orderdate='2001/12/01' and orders.prodcode=101;

One way to process the foregoing query would be to (1) retrieve the rows that meet the orderdate and prodcode constraints, (2) redistribute the output that contains those rows to all the units by the custid value, and (3) join the output to the customer table. The first step specifies the primary index of the orders table, orderdate, and therefore has single parallelism—can be performed on one storage and processing unit. The third step does not specify the primary index of the customer table, but does use the output of the previous step as an input. The redistribution of the output indicates that it has a hashed geography. Therefore, if the number of output rows is less than the preset number and the rows retrieval step had specified characteristics, discussed in more detail with reference to FIG. 5, the parallelism of step (3) can be measured as partial rather than total.

Figure 5:
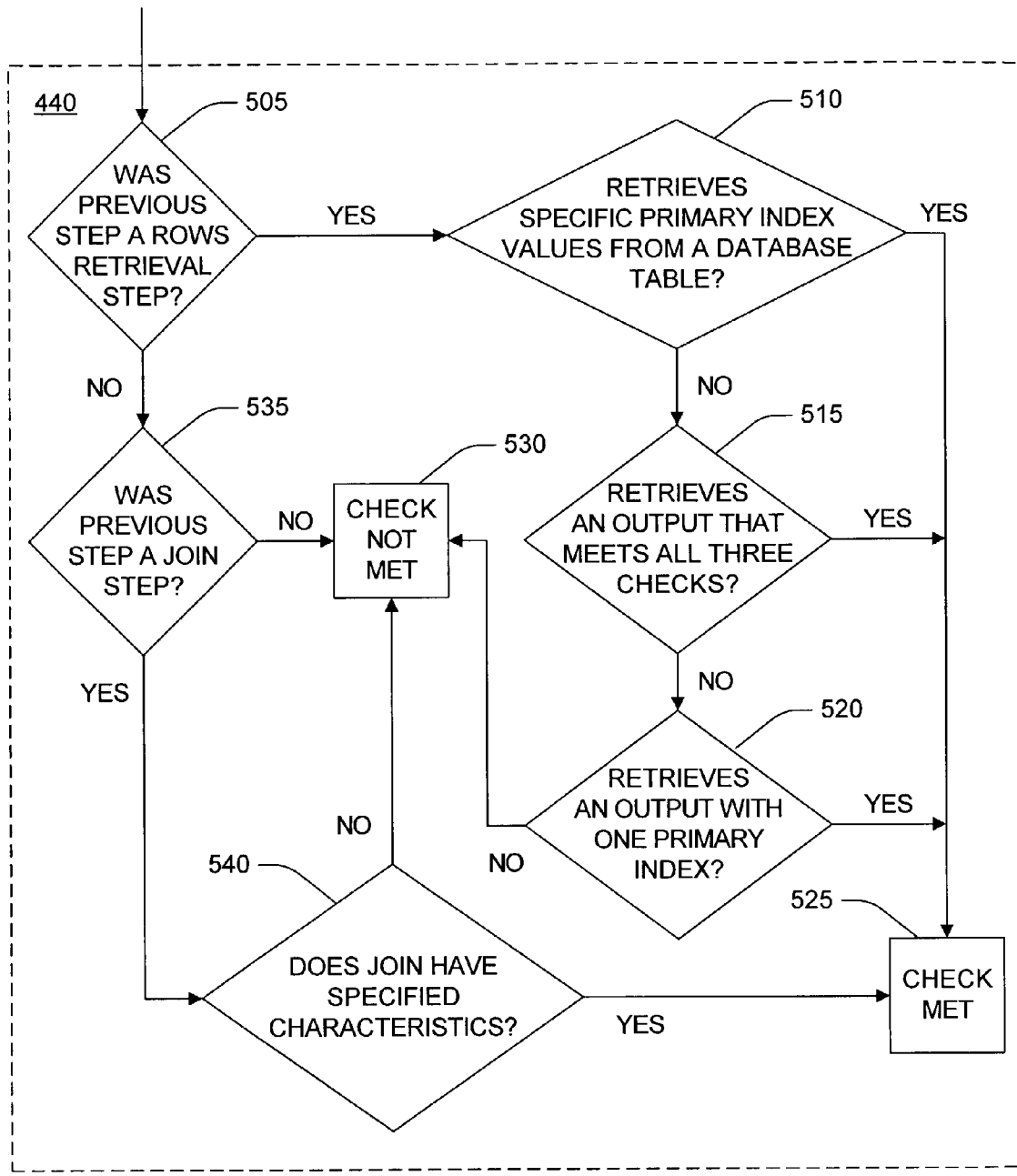
FIG. 5 is a flow chart of a method for checking whether a previous step was of a specified type.

FIG. 5 depicts a more detailed flowchart of the step of checking the previous step that generated the output to see if it was a rows retrieval or join step with specified characteristics 440. If the previous step was a rows retrieval step 505, then the step is compared to three specified types of row retrieval steps. First, the step is compared to a rows retrieval step from a database table for specific primary index values 510. For example, the first step in Example 1 was a row retrieval step from a database table, orders, that specified a primary index value, orderdate='2001/12/01'. A row retrieval step that retrieved rows having a date in a range, for example orders.orderdate IN ('2001/12/01'.'2001/12/10), also specifies primary index values. If the comparison is true, the step meets the check 525. Another possibility is that the rows retrieval step retrieves rows from an output that itself meets all three checks (430, 435, 440) 515. Thus if a first output meets all three checks, a second output of a step retrieving rows from the first output meets the third check 525. A third possibility is that the step retrieves rows from an output with one primary index 520. Thus, if a first output is from a step having single parallelism, a second output of a step retrieving rows from the first output meets the third check 525. If the rows retrieval step that produced the output is not one of the three specified types, the check is not met 530.

If the previous step is not a rows retrieval step and is not a join step 535, then the check is not met 530. If the previous step is a join step, then the check is met 525 only if the join has specified characteristics 540, otherwise the check is not met 530. The specified characteristics of previous steps that are join steps are presented in further detail with reference to FIG. 6.

Figure 6:
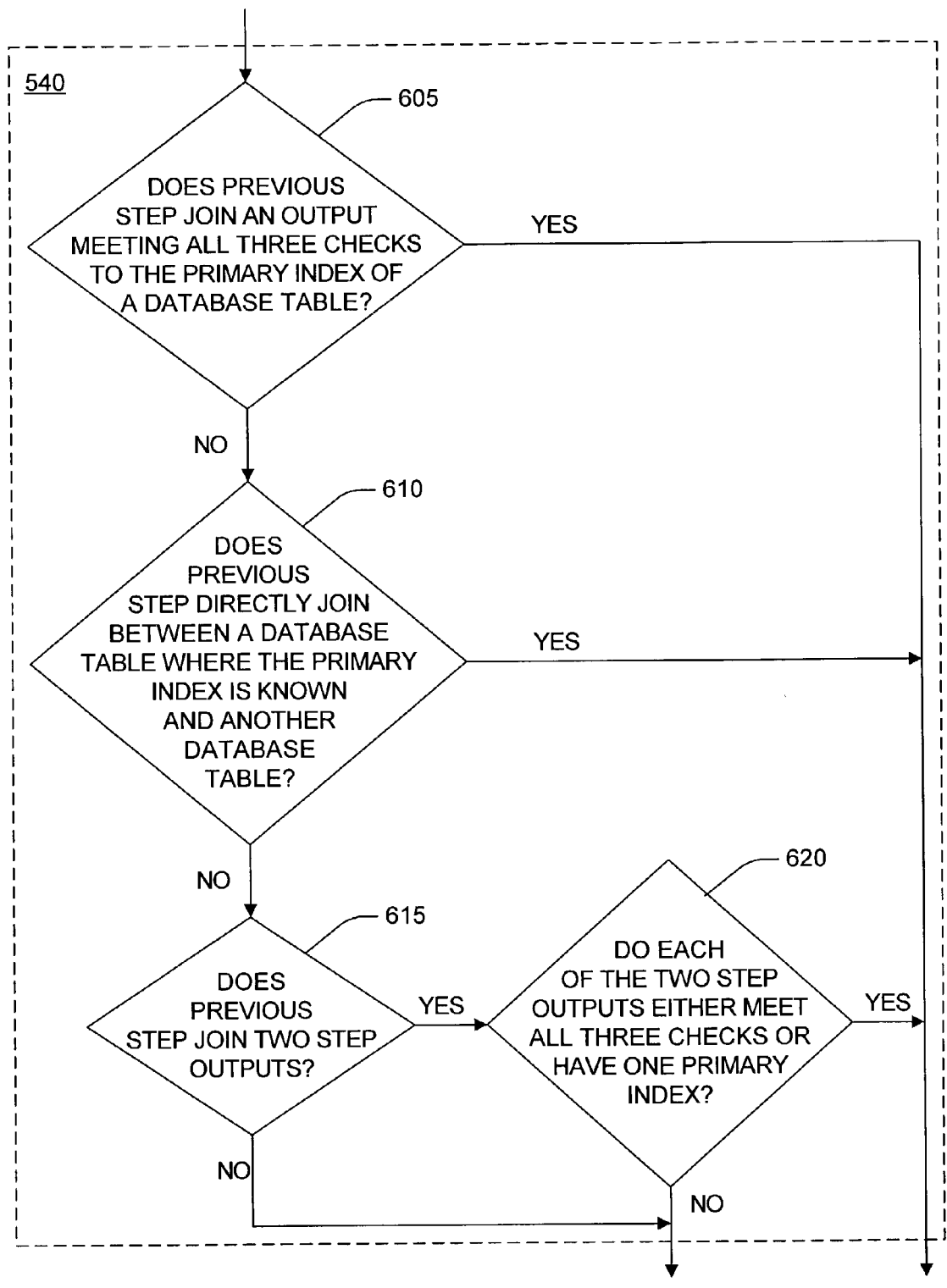
FIG. 6 is a flow chart of a method for determining whether a join step has specified characteristics.

FIG. 6 depicts a flowchart of a method for determining whether a previous join step has specified characteristics 540. If the previous join step joins an output of a previous step to the primary index of a database table and that output to be joined meets all three checks (430, 435, 440) 605, then the previous join step has the specified characteristics 630. If the previous join step directly join between a database table where the primary index is known and another database table 610, then the previous join step has the specified characteristics 630. If the previous join step joins two step outputs 615 and each of those outputs either contains rows with only one primary index or meets all three checks (430, 435, 440) 620, then the previous join step has the specified characteristics 630. Otherwise, the previous join step does not have the specified characteristics 625.

The determination of the parallelism of an execution step can depend recursively on whether the inputs to that execution step were themselves generated by execution steps having certain parallelism. In one implementation, an algorithm is used recursively to determine the parallelism of steps using output from previous steps in a set of execution steps corresponding to a query. When a retrieve rows step is generated to retrieve rows from a relation into a spool file, a spool file is one name for the output of a previous step, where the relation is represented by a Relation structure, a function CheckSnglSource is called to determine if the spool file output by the retrieve rows step meets all three checks. This function checks the estimated number of rows selected, the geography of the spool file and analyzes the source relation of the retrieval compared to the relation types of FIGS. 5 and 6. Whether the three checks are met is recorded in the Relation structure. In the case that the output of the retrieve rows step is an input to a join, whether the spool files meets the three checks is copied to the JoinPlan structure that records information about the join.

When a join step is generated, a function CheckJoinSource is called to determine if the spool file that the join outputs meets all three checks. This function checks the estimated number of rows resulting from the join, the geography of the output and analyzes join inputs compared to the relation types of FIGS. 5 and 6. For an input that is a database table, the function CheckSnglSource is called to analyze the input. Whether the output file of the join meets all three checks is recorded in the Relation structure that corresponds to the joined relation. If the joined relation is an input to a following binary join, whether that input meets all three checks is copied to the Join Plan structure of that binary join.

These alternative implementations make the measurement of parallelism more efficient by including information necessary for measuring a later step in the output of earlier steps. The measurement process can then determine whether a particular step has single, partial, or total parallelism from the step itself and the information contained in its inputs without having to repetitively analyze the structure of former steps or outputs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for measuring parallelism associated with a database execution step in a computer implemented database system where the parallelism is an indicia of database system resources required by the execution step, the method including the steps of:
  determining whether the execution step operates only on rows having a specified primary index;
  if the primary index of the rows is specified, the parallelism for the execution step is measured as single;
  if the primary index of the rows is not specified, determining whether the execution step uses an output from a first previous execution step, the output having a number of rows;
  if the output is not used by the execution step, the parallelism for the execution step is measured as total;

if the output is used by the execution step, comparing the number of rows in the output to a specified number; and if the number of rows is greater than the specified number, the parallelism for the execution step is measured as total.

2. The method of claim 1 where the database system includes a number of parallel units and the specified number is a percentage of the number of parallel units.

3. The method of claim 1 where the database system includes a number of parallel units and further including the steps of:

if the output is used by the execution step, determining the geography of the output; and if the geography of the output writes the output rows to all the parallel units, the parallelism for the execution step is measured as total.

4. The method of claim 1 further including the steps of:

if the output is used by the execution step, comparing the first previous step to specified types; and if the first previous execution step is not one of the specified types, the parallelism for the execution step is measured as total.

5. The method of claim 4 where the specified types include row retrieval steps that retrieve rows with specific primary index values from a database table.

6. The method of claim 4 where the specified types include row retrieval steps that retrieve rows from an output of a second previous execution step that has single or partial parallelism.

7. The method of claim 4 where the database system includes a database table with a primary index and the specified types include join steps that join an output of a second previous execution step that has partial parallelism to the primary index of the database table.

8. The method of claim 4 where the specified types include join steps that directly join between a first database table having a known primary index and a second database table.

9. The method of claim 4 where the specified types include join steps that join an output of a second previous execution step and an output of a third previous execution step, where each of the second and third previous execution steps has single or partial parallelism.

10. The method of claim 1 further including the steps of:

if the output is used by the execution step, determining the geography of the output;

if the output is used by the execution step, comparing the first previous execution step to specified types; and if (1) primary index of the rows is not specified, (2) the number of rows is not greater than the specified number, (3) the geography of the output does not write the output rows to all the parallel units, and (4) the first previous execution step is one of the specified types, the parallelism for the execution step is measured as partial.

11. A computer program, stored on a tangible storage medium, for use in measuring parallelism associated with a database execution step in a computer implemented database system where the parallelism is an indicia of database system resources required by the execution step, the program including executable instructions that cause a computer to:

determine whether the execution step operates only on rows having a specified primary index;

if the primary index of the rows is specified, the parallelism for the execution step is measured as single;

if the primary index of the rows is not specified, determine whether the execution step uses an output from a first previous execution step, the output having a number of rows;

if the output is not used by the execution step, the parallelism for the execution step is measured as total;

if the output is used by the execution step, compare the number of rows in the output to a specified number; and if the number of rows is greater than the specified number, the parallelism for the execution step is measured as total.

12. The computer program of claim 11 where the database system includes a number of parallel units and the specified number is a percentage of the number of parallel units.

13. The computer program of claim 11 where the database system includes a number of parallel units and further including executable instructions that cause the computer to:

if the output is used by the execution step, determine the geography of the output; and if the geography of the output writes the output rows to all the parallel units, the parallelism for the execution step is measured as total.

14. The computer program of claim 11 further including executable instructions that cause the computer to:

if the output is used by the execution step, compare the first previous execution step to specified types; and if the first previous execution step is not one of the specified types, the parallelism for the execution step is measured as total.

15. The computer program of claim 14 where the specified types include row retrieval steps that retrieve rows with specific primary index values from a database table.

16. The computer program of claim 14 where the specified types include row retrieval steps that retrieve rows from an output of a second previous execution step that has single or partial parallelism.

17. The computer program of claim 14 where the database system includes a database table with a primary index and the specified types include join steps that join an output of a second previous execution step that has partial parallelism to the primary index of the database table.

18. The computer program of claim 14 where the specified types include join steps that directly join between a first database table having a known primary index and a second database table.

19. The computer program of claim 14 where the specified types include join steps that join an output of a second previous execution step and an output of a third previous execution step, where each of the second and third previous execution steps has single or partial parallelism.

20. The computer program of claim 11 further including executable instructions that cause the computer to:

if the output is used by the execution step, determine the geography of the output;

if the output is used by the execution step, compare the first previous execution step to specified types; and if (1) primary index of the rows is not specified, (2) the number of rows is not greater than the specified number, (3) the geography of the output does not write the output rows to all the parallel units, and (4) the first previous execution step is one of the specified types, the parallelism for the execution step is measured as partial.

21. A computer implemented database system for measuring parallelism associated with a database execution step where the parallelism is an indicia of database system resources required by the execution step, the system comprising:
   one or more nodes;
      a plurality of CPUs, each of the one or more nodes providing access to one or more CPUs;
      a plurality of processes, each of the one or more CPUs providing access to one or more virtual processes;
      each process configured to manage data, including database table rows, stored in one of a plurality of data-storage facilities; and
      a execution step analysis component configured to measure parallelism by:
      determining whether the execution step operates only on rows having a specified primary index;
      if the primary index of the rows is specified, the parallelism for the execution step is measured as single;
      if the primary index of the rows is not specified, determining whether the execution step uses an output from a first previous execution step, the output having a number of rows;
      if the output is not used by the execution step, the parallelism for the execution step is measured as total;
      if the output is used by the execution step, comparing the number of rows in the output to a specified number; and
      if the number of rows is greater than the specified number, the parallelism for the execution step is measured as total.

22. The system of claim 21 where the specified number is a percentage of the number of nodes.

23. The system of claim 21 where the execution step analysis component is further configured to measure parallelism by:
   if the output is used by the execution step, determining the geography of the output; and
   if the geography of the output writes the output rows to all the parallel units, the parallelism for the execution step is measured as total.

24. The system of claim 21 where the execution step analysis component is further configured to measure parallelism by:
   if the output is used by the execution step, comparing the first previous execution step to specified types; and
   if the first previous execution step is not one of the specified types, the parallelism for the execution step is measured as total.

25. The system of claim 24 where the specified types include row retrieval steps that retrieve rows with specific primary index values from a database table.

26. The system of claim 24 where the specified types include row retrieval steps that retrieve rows from an output of a second previous execution step that has single or partial parallelism.

27. The system of claim 24 where the database system includes a database table with a primary index and the specified types include join steps that join an output of a second previous execution step that has partial parallelism to the primary index of the database table.

28. The system of claim 24 where the specified types include join steps that directly join between a first database table having a known primary index and a second database table.

29. The system of claim 24 the specified types include join steps that join an output of a second previous execution step and an output of a third previous execution step, where each of the second and third previous execution steps has single or partial parallelism.

30. The system of claim 21 where the execution step analysis component is further configured to measure parallelism by:
   if the output is used by the execution step, determining the geography of the output;
   if the output is used by the execution step, comparing the first previous execution step to specified types; and
   if (1) primary index of the rows is not specified, (2) the number of rows is not greater than the specified number, (3) the geography of the output does not write the output rows to all the parallel units, and (4) the first previous execution step is one of the specified types, the parallelism for the execution step is measured as partial.

* * * * *